US011663356B1

(12) United States Patent
Vernon Sahayam et al.

(10) Patent No.: US 11,663,356 B1
(45) Date of Patent: May 30, 2023

(54) METHODS AND APPARATUS FOR DYNAMIC DATA ACCESS PROVISIONING

(71) Applicant: Fannie Mae, Washington, DC (US)

(72) Inventors: Maria Vindhan Vernon Sahayam, Herndon, VA (US); Basavaraj R. Hubli, Ashburn, VA (US); Mustafa S. Kapadia, Chantilly, VA (US)

(73) Assignee: Fannie Mae, Washington, DC (US)

( * ) Notice: Subject to any disclaimer, the term of this patent is extended or adjusted under 35 U.S.C. 154(b) by 0 days.

(21) Appl. No.: 17/150,150

(22) Filed: Jan. 15, 2021

(51) Int. Cl.
  *G06F 21/62* (2013.01)
  *G06F 21/33* (2013.01)
  *H04L 9/40* (2022.01)

(52) U.S. Cl.
  CPC ........ *G06F 21/6236* (2013.01); *G06F 21/335* (2013.01); *H04L 63/0815* (2013.01); *G06F 2221/2139* (2013.01); *G06F 2221/2141* (2013.01); *G06F 2221/2143* (2013.01)

(58) Field of Classification Search
  CPC ..... G06F 21/31; G06F 21/41; G06F 21/6218–6236; G06F 2221/2139; G06F 2221/2141; H04L 63/08; H04L 63/0815; H04L 63/10; H04L 63/102; H04L 63/20
  See application file for complete search history.

(56) References Cited

U.S. PATENT DOCUMENTS

2023/0025808 A1 * 1/2023 Gupta ................. H04L 63/08

FOREIGN PATENT DOCUMENTS

EP 3629547 A1 * 4/2020 ............ G06F 21/44

* cited by examiner

*Primary Examiner* — Kevin Bechtel
(74) *Attorney, Agent, or Firm* — Michael Best & Friedrich LLP

(57) ABSTRACT

According to one aspect of this disclosure, dynamic access provisioning provides a centralized, flexible and consistent mechanism to grant access rights to data in real-time by dynamically evaluating access policies that involve user, data and environmental attributes. The mechanism handles complex authorization policies involving numerous different user types with differing access needs and rights, as well as numerous different data sources with differing access requirements. The mechanism also simplifies data usage by providing a single-context experience in a user session, giving access to data from multiple diverse data sources in one access context. Data could be in different domains or project spaces. Users (or the data access apps they create in the session) are not required to switch access contexts to access all the data they are entitled to. The system is also scalable, in that additional data users and data producers may be easily added to the dynamic access provisioning environment.

14 Claims, 7 Drawing Sheets

METHODS AND APPARATUS FOR DYNAMIC DATA ACCESS PROVISIONING

BACKGROUND OF THE INVENTION

This application relates generally to data access provisioning and more particularly dynamic data access provisioning in a heterogenous, highly distributed data platform environment.

Enterprises are challenged with governing data access among numerous different business units and users with differing access needs and rights, as well as numerous different data sources with differing access requirements.

Current access provisioning processes rely upon the creation of customized access entitlements. For example, multiple access entitlements may be created to accommodate data accesses from multiple diverse data sources from different domains for a given type of user. This type of approach is manual and relatively static, and thus does not adjust well to the needs of various users and data sources. Also, users (or the data access apps they use) need to switch access contexts to access all the data they are entitled to. Many of data access apps can't switch access contexts and would require inefficient data copying and/or additional pre-handling of data to work with multiple diverse data sources. The provisioning approach also carries various logistical challenges, including inconsistent support, difficulties onboarding new data sources, and an absence of scalability.

What is needed are methods and apparatus for data access provisioning that more flexibly and dynamically accommodate access to data, simplifying access and usage of data for users.

SUMMARY OF THE INVENTION

According to one aspect of this disclosure, dynamic access provisioning provides a centralized, flexible and consistent mechanism to grant access rights to data in real-time by dynamically evaluating access policies that involve user, data and environmental attributes. The mechanism handles complex authorization policies involving numerous different user types with differing access needs and rights, as well as numerous different data sources with differing access requirements. The mechanism also simplifies data usage by providing a single-context experience in a user session, giving access to data from multiple diverse data sources in one access context. Data could be in different domains or project spaces. Users (or the data access apps they create in the session) are not required to switch access contexts to access all the data they are entitled to. The system is also scalable, in that additional data users and data producers may be easily added to the dynamic access provisioning environment.

In one example, a DAP system provisions a single-context session to a user requesting data access to multiple diverse data sources. In particular, the DAP System is configured to receive, from a user computer, a data access request corresponding to a plurality of datasets, the plurality of datasets respectively having different access criteria, and generate a single-context session for the data access request, the single-context session extending data access to the plurality of data sets to the user computer. To carry this out, the DAP System determines the dataset permissions the user should be granted based on a real-time evaluation of access policies using information from the data access request and from a catalog of datasets collected from various data sources. A single-context session is instantiated by creating principals in real-time in the domains (Data Producer Domains) in which data resides and in the Data User Domain. The DAP System then provides an access credentials token for the user to login into the session to access data. The DAP System also provides the user session with temporary access credentials to automatically authorize the user to access data in different domains where data resides. The temporary access credentials are periodically refreshed and extended through the life of the session. The principals and access credentials are destroyed on termination of the user session. In this and other examples, the DAP System provides technical solutions to a number of technical computer problems, including those involving access to numerous different data sources with differing access requirements.

The present invention can be embodied in and in connection with various forms, including but not limited to business processes, computer implemented methods, computer program products, computer systems and networks, user interfaces, and application programming interfaces.

BRIEF DESCRIPTION OF THE DRAWINGS

These and other more detailed and specific features of the present invention are more fully disclosed in the following specification, reference being had to the accompanying drawings, in which.

DETAILED DESCRIPTION OF THE INVENTION

Figure 1:
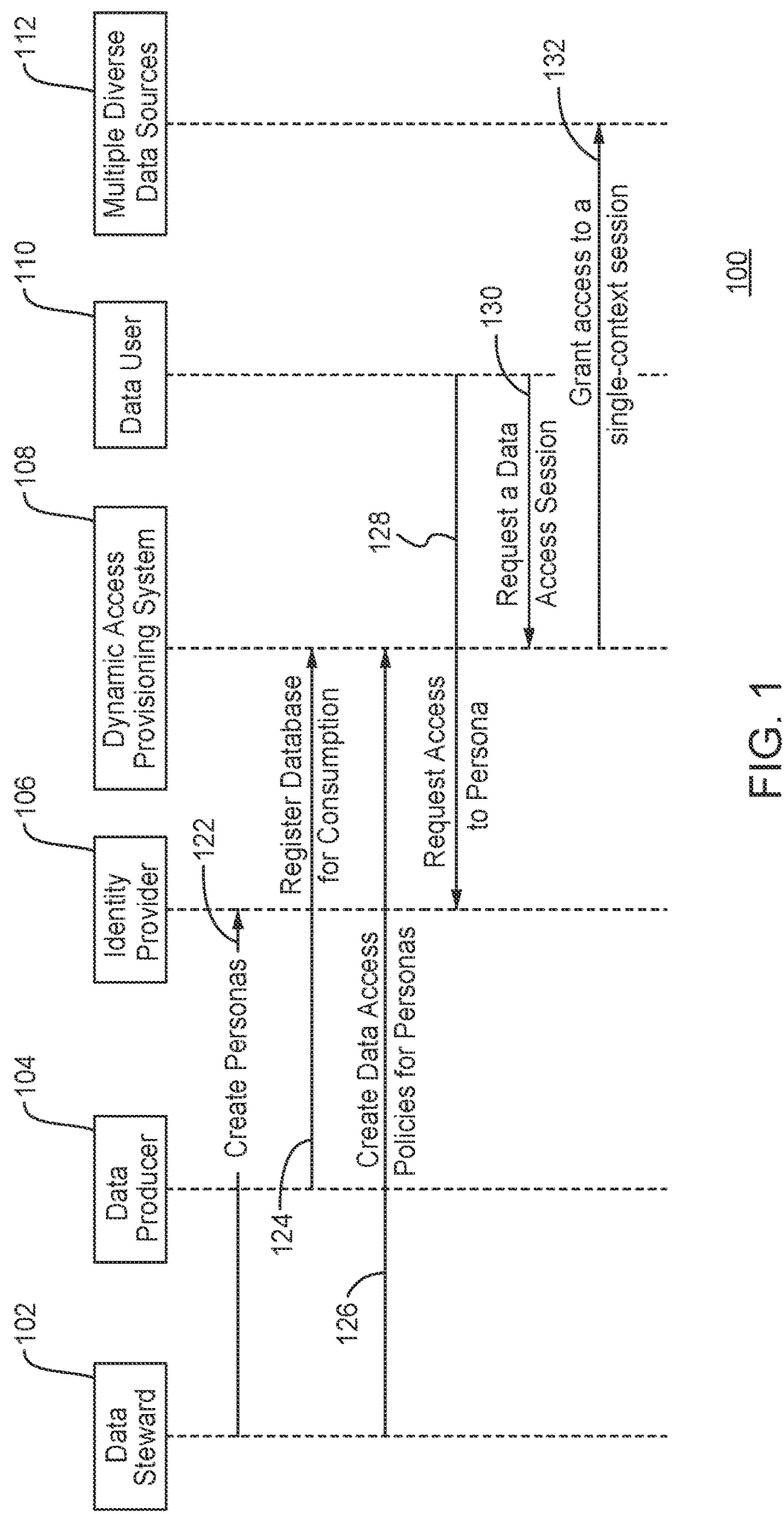
FIG. 1 is an event diagram illustrating an example of dynamic access provisioning.

In the following description, for purposes of explanation, numerous details are set forth, such as flowcharts and system configurations, in order to provide an understanding of one or more embodiments of the present invention. However, it is and will be apparent to one skilled in the art that these specific details are not required in order to practice the present invention.

As introduced above, existing data access provisioning schemes are static. That is, although they can provide intra and cross-domain data accesses, they only do so on the basis of customized provisioning processes that are specifically tailored to the specific access that is required. This creates significant issues for enterprises seeking to manage and onboard diverse datasets.

According to one aspect of this disclosure, dynamic access provisioning provides a centralized, flexible and consistent mechanism to grant access rights to data in real-time by dynamically evaluating access policies that involve user, data and environmental attributes. The mechanism can handle complex authorization policies involving numerous different user types with differing access needs and rights, as well as numerous different data sources with differing access requirements. The mechanism also simplifies data usage by providing a single-context experience in a user session, giving access to data from multiple diverse data sources in one context. Data could be in different domains or project spaces. Users (or the data access apps they create in the session) don't have to switch access contexts to access all the data they are entitled to. The system is also scalable, in that additional data users and data producers may be easily added to the dynamic access provisioning environment.

The access provisioning is preferably implemented on a computing platform that includes a Dynamic Access Provisioning (DAP) System. It provides a single-context experience in a user session, giving access to data from multiple diverse data sources in one context. Data can be accessed despite it being in different producer domains (or project spaces). Users (or the data access apps they create in the session) are not required to switch contexts to access data they are entitled to. This contrasts existing computer technology problems wherein data access apps cannot switch contexts and require inefficient data copying and/or additional pre-handling of data to work with multiple diverse data sources.

Additionally, user sessions and principals are provisioned and de-provisioned in real time—created only when the user requests access from DAP and destroyed when the session is terminated by the user or when DAP expires the session. DAP sets time limits on sessions and permissions, preventing access creep. A synchronous process is preferably used for provisioning, so access is immediate. De-provisioning is implemented as an asynchronous process.

DAP also provides a policy authoring system. Data from different domains are collected, classified and catalogued for assigning policies. This is followed by creation of data access policies which sets rules on who has access to the various catalogued data and in what context. Policy authoring is decoupled from implementation i.e., the policy is defined once and can be applied across in multiple domains or environments Users can choose to create sessions in any user domain. For example, they can create sessions in any Amazon Web Services (AWS) accounts, in Google Cloud Project Space, or others. The DAP Engine is configured so that data users do not need to repeatedly input credentials to access data from a producer domain. The user session context automatically authorizes the user when the user is in the single-context session.

FIG. 1 is an event diagram illustrating an example of a process for dynamic access provisioning 100. In one example, the dynamic access provisioning is provided in an Amazon Web Services (AWS) environment. The dynamic access provisioning may also be provided in other environments including Microsoft Azure, IBM Cloud, Oracle Cloud, VMware Cloud, Dell Technologies Cloud, and Alibaba Cloud.

Various computing entities participate in the dynamic access provisioning 100. For example, a Data Steward 102, Data Producer 104, Identity Provider 106 and Data User 110 are illustrated, along with the Dynamic Access Provisioning (DAP) System 108 and Multiple Diverse Data Sources 112.

These labels are used for ease of discussion. Underlying each entity is a computing platform that is configured to carry out the described processes and interactions. Where such interactions and processes are described, they are performed by the computing platform, rather than by mental processes. Additionally, the computing platforms respectively include non-transitory computer readable media that store program code. That program code is executable by one or more processors on the respective computing platforms in order to carry out the described processes The Data Steward 102 manages the enterprise's data access. It is tasked with incorporating company policies to ensure that all enterprise data remains compliant with any internal or external obligations. The Data Steward 102 computing environment is configured to create 122 personas to be used in the dynamic provisioning environment. Personas are used to define the context in which users would operate at the time of data access request and are defined using attributes. The creation 122 of personas is preferably performed in conjunction with the participation of the Identity Provider 106 computing platform. The Identity Provider 106 is configured to provide to DAP System 108 information on users (identities) and their persona (attributes). The Identity Provider 106 may implement a directory to organize participants, and may use a directory management service such as Microsoft Active Directory. An identity and access management service may also be used to assist in accessing and managing the directory.

The DAP system 100 also involves discovering, collecting, classifying and cataloguing data from different data sources. This cataloguing may happen through data crawlers that run in the domains where data resides. Data crawlers read datasets and infer the type and schema of data using classification algorithms. This information is then centrally collected and stored in data catalog within the DAP system. Additionally, the Data Producer 104 computing platform may interact with the DAP System 108 to register 124 its datasets. Data Producers have ownership or responsibility over the data they produce. Although the figure discloses a single Data Producer participant for simplicity, there will typically be many different data producers that are responsible for their respective diverse datasets. The registered datasets have a set of attributes (aka metadata) that are used to support policy evaluation as discussed further below. For example, the attributes may include types of accessors, location of access, means of access, and other criteria that indicate where, how and by whom the data may be accessed. These attributes may be organized in the form of tags associated to the dataset. The information in the data catalog along with information from dataset registrations are used for creating data access policies for personas 126.

Although FIG. 1 illustrates discrete steps 122-132 in a vertical direction, the sequence of such steps may differ from that shown in the figure. Additionally, some steps may occur concurrently, if desired. For example, the creation 122 of personas and the registration 124 of datasets may occur in any order or may occur in parallel.

The Data User 110 computing platform is invoked to access various types of data. The DAP System 108 arbitrates the user's access to that data. Initially, the Data User 110 requests 128 access to persona(s) in order to initiate the data access process. This request is shown to extend to the Identity Provider 106. However, the Data User 110 initially interfaces with and communicates through the DAP System 108. Although it is not necessary to be shown in the figure, there may be initial registration and login procedures in order to establish, initially, the identity of the user for future authentication and authorization. Additionally, the DAP System 108 controls which personas any given data user should be allowed to request. In any event, by virtue of the association 126 of data access policies to persona(s), the Data User 110 is thereby automatically associated to the datasets that the policies allow, when the policies are evaluated at the time of data access request 130.

Under these arrangements, the Data User 110 may, at any time, request 130 the creation of a data access session. At this time, the DAP System 108 uses data access policies to dynamically determine the dataset permissions the Data User 110 assuming a given persona is entitled to. The determination of dataset permissions is done by executing the rules in the data access policies programmatically. An example of the rule execution would be to match the attributes of the persona with the attributes of the datasets registered in the data catalog. The rules in the data access policies provide a flexible way to map datasets with persona using attributes. Rules can be coarse-grained. For example, a rule could be created to give access to all data in the enterprise to a certain persona. Rules can also be fine grained. For example, a rule could be created to allow access to a certain highly confidential dataset to a certain authorized user or group of users. Using the dynamically determined dataset permissions, the Data User 110, is then granted 132 access to Multiple Diverse Data Sources 112 under a single-context session.

Figure 2:
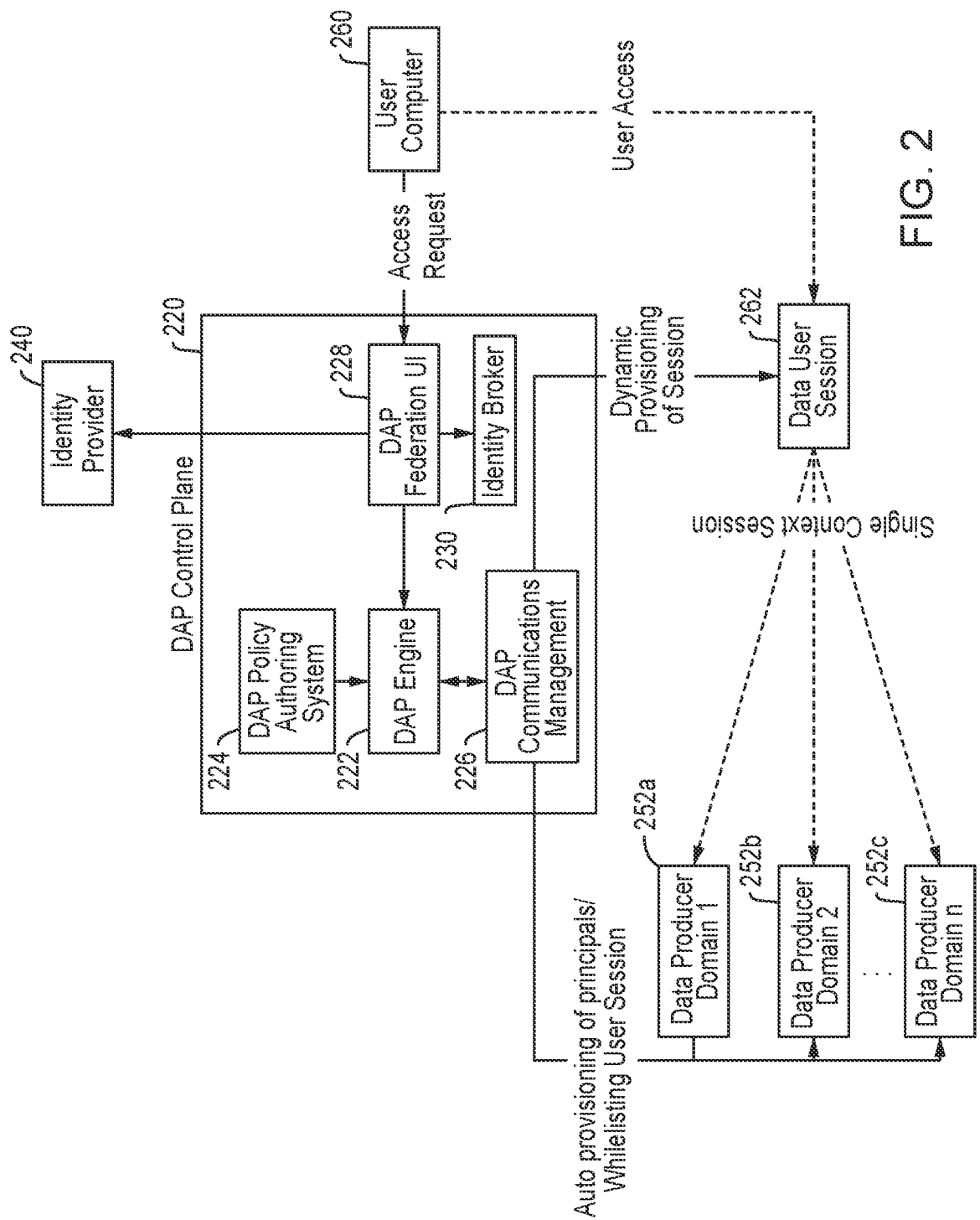
FIG. 2 is a block diagram illustrating an example of a dynamic access provisioning platform that includes a dynamic access provisioning engine.

FIG. 2 is a block diagram illustrating an example of a DAP environment, and in particular a DAP Control Plane 220. The DAP Control Plane 220 preferably performs its described features through the execution of program code by one or more processors. These features include the implementation of dynamic access provisioning, including the granting of single-context session to access multiple distinct and diverse data stores in the enterprise in which the DAP Control Plane 220 is implemented. The program code may be stored on non-transitory computer readable media within the DAP Control Plane 220 or elsewhere.

The DAP Control Plane 220 receives data access request from the User Computer 260 and directs the provisioning of principals in various Data Producers domains 252*a-c* as well as the provisioning of principal in the user domain resulting in the creation of a Data User Session 262. It also provides the User Computer 260 with tokens to accommodate the user access. An Identity Provider 240 is shown separately from the DAP Control Plane 220 and may be any service that assists in the identification and authentication of users pursuant to the granting of access rights.

The DAP Control Plane 220 includes a DAP Engine 222, DAP Policy Authoring System 224, DAP Communications Management 226, DAP Federation UI 228 and DAP Identity Broker 230. Each of these components may be implemented as software executable by one or more processors to provide the described functionality. One or more of the modules may also be provided as hardware or firmware, or a combination of software or firmware.

The User Computer 260, the Data Producer Domains 252*a-c* and Identity Provider 240 are also preferably computer implemented, again in the form of program code executable by one or more processors to provide the described features.

The DAP Engine 222 manages the creation of single-context session and coordinates the roles of the other modules in carrying out the same. In particular, the DAP Engine 222 is configured to receive, from a user computer, a data access request corresponding to a plurality of datasets, the plurality of datasets respectively having different access criteria, and generate a single-context session for the data access request, the single-context session extending data access to the plurality of data sets to the user computer. To carry this out, the DAP Engine 222 uses policies authored and stored in the DAP Policy Authoring System 224. Data from different domains are collected, classified and catalogued for assigning policies. This is followed by creation of data access policies which sets rules on who has access to the various catalogued data and in what context. At the time of data access request, the DAP Engine 222 uses data access policies to dynamically determine the dataset permissions the user assuming a given persona is entitled to. Persona is the context in which the user operates at the time of data access request. One of the methods of determination of dataset permissions is through matching attributes of the given persona with attributes of the datasets. The dataset permissions are used to construct a single-context Data User Session 262 by creating principals in real time in the Data Producer Domains 252*a-c* and in the Data User Domain (the domain that the user intends to operate in). The DAP Engine 222 provides the Data User Session 262 with temporary access credentials to automatically authorize the user, who is logged into the session, to access data in different Data Producer Domains 252*a-c*. The temporary access credentials are periodically refreshed and extended through the life of the session. The principals are destroyed on termination of the Data User Session 262.

The DAP Federation UI 228 governs the interface with the User Computer 260 as the user-facing recipient of access requests and user-facing grantor of access to the user. The DAP Federation UI 228 using DAP Identity Broker 230 provides a session token for the user to login into the single-context Data User Session 262 to access data It also works with the Identity Provider 240 to provide a system of trust between parties with respect to user authentication and authorization. The Identity Provider 240 stores user attributes for the various users registered from the DAP Control Plane 220. These features include the creation and management of users (and groups). The Identity Provider 240 preferably vends tokens with attributes to further the provisioning of single-context sessions. The Identity Provider 240 may be setup to work with an authoritative source of identity information such as Windows Active Directory In one example, the DAP Control Plane 220 works with Amazon Web Services (AWS). The DAP Control Plane 220 may also work in other environments including Azure, Google and IBM cloud services environments.

The Data Producer Domains 252*a-c* correspond to the various data producers. The DAP Communications Management 226 works with Data Producer domains 252*a-c* for auto provisioning of principals and the whitelisting of data access sessions.

Figure 3:
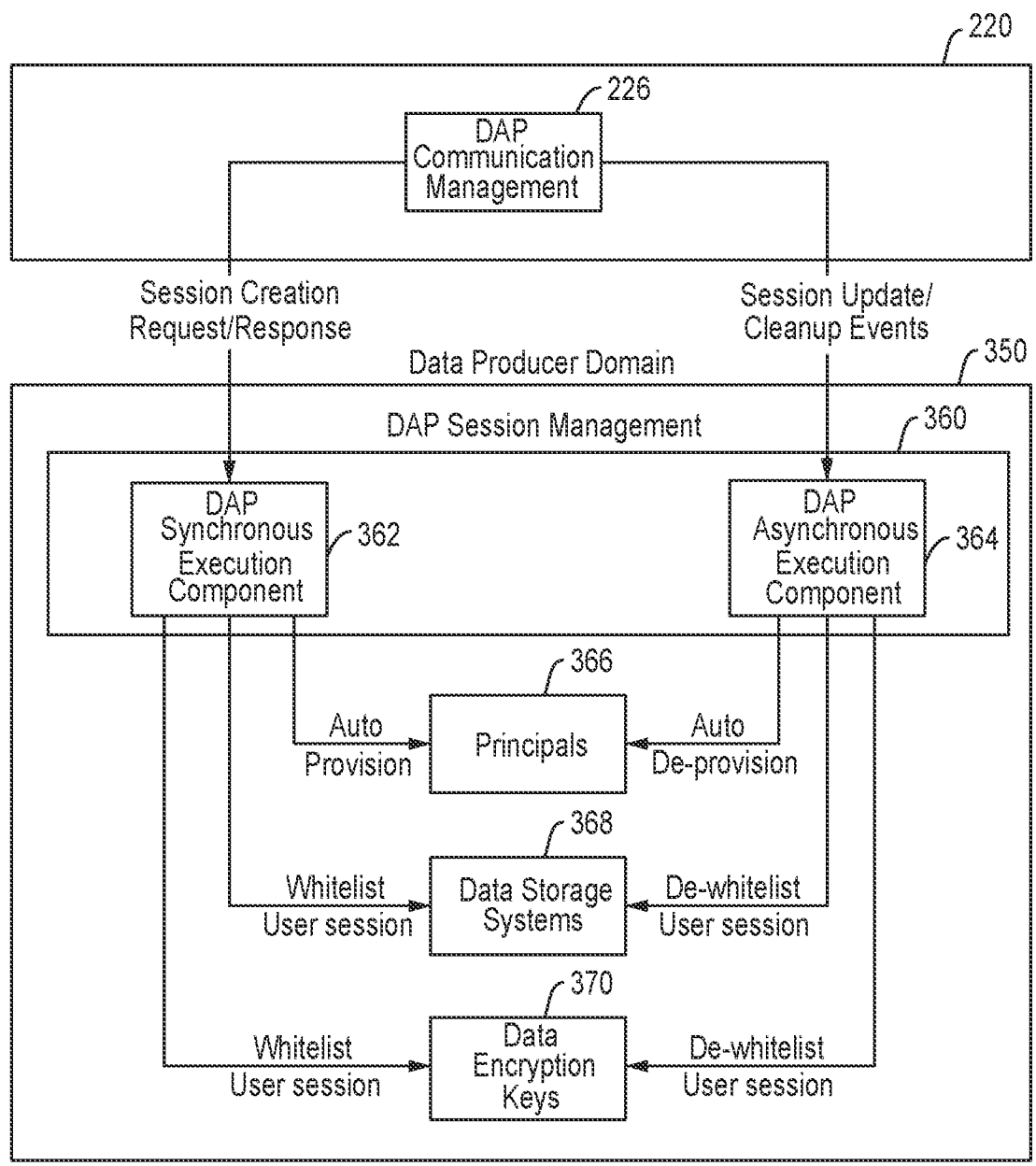
FIG. 3 is a block diagram illustrating an example of dynamic access provisioning platform interaction with data producer computing resources in the data producer domain.

FIG. 3 is a block diagram illustrating an example of a Data Producer Domain 350 computing platform that includes a DAP Synchronous Execution Component 362 and a DAP Asynchronous Execution Component 364. The DAP Communication Management 226 in the DAP Control Plane communicates with the DAP Synchronous Execution Component 362 and DAP Asynchronous Execution Component 364 to further the control of the provisioning and de-provisioning of principals to data access, and the whitelisting and de-whitelisting of corresponding content in the data storage systems. Generally, the provisioning side is carried out synchronously, so that data access rights can be immediately provided to the requesting user. The de-provisioning can be carried out asynchronously. The Data Producer Domain 350 is shown generally in the figure. Preferably, each of several individual data producer domains (e.g., FIG. 2, 352*a-c*) are configured accordingly.

Figure 4:
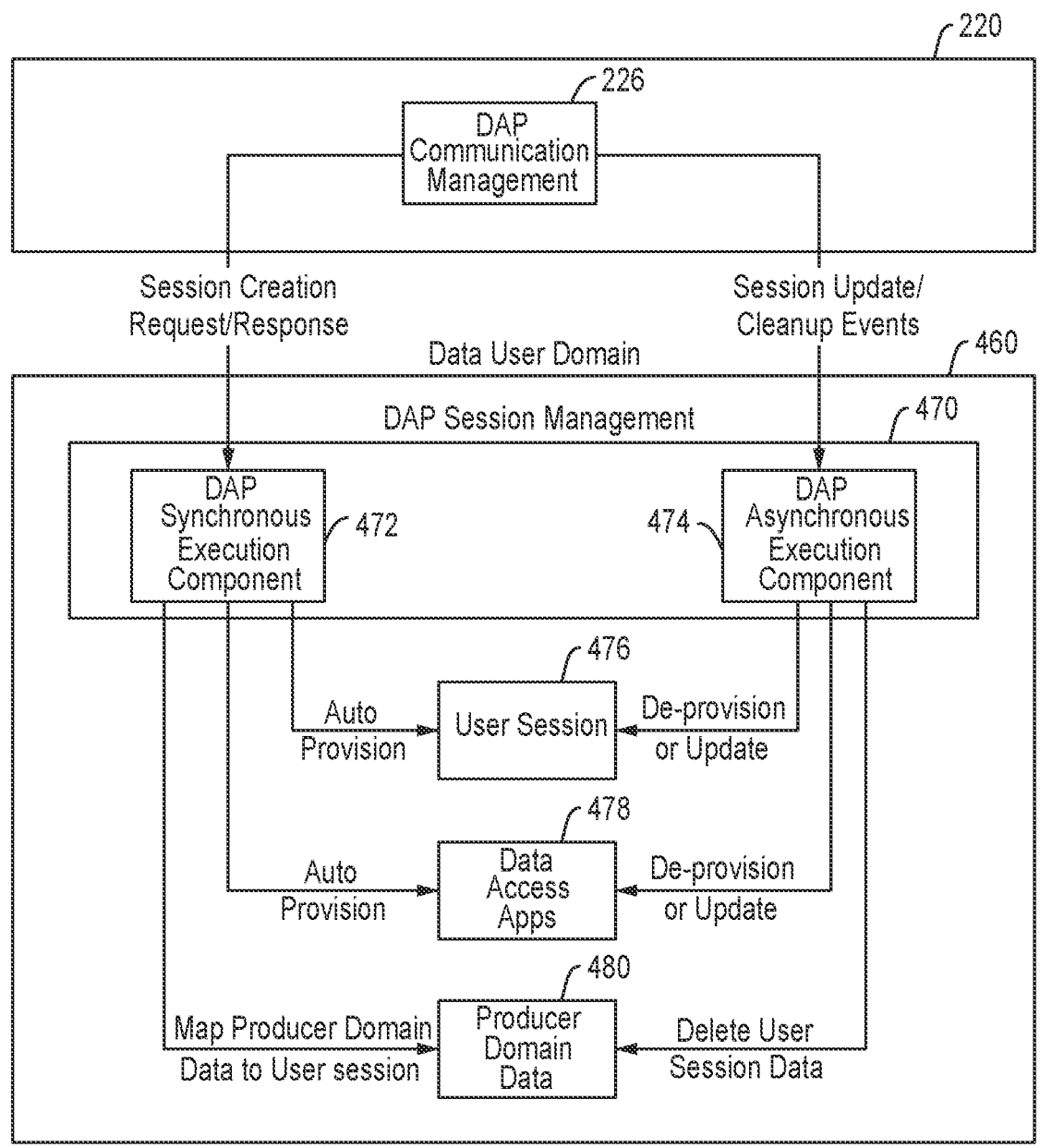
FIG. 4 is a block diagram illustrating an example of dynamic access provisioning platform interaction with data user computing resources in the data user domain.

FIG. 4 is a block diagram illustrating an example of a Data User Domain 460 computing platform. The DAP Communications Management 226 component of the DAP Control Plane 220 coordinates the provisioning of single-context data access sessions. The Data User Domain 460 includes a DAP Synchronous Execution 472 component and a DAP Asynchronous Execution 474 component that respectively control the provisioning and de-provisioning of the sessions. The DAP Synchronous Execution Component 472 and DAP Asynchronous Execution Component 474 provision and de-provision user sessions 476, data access apps 478 and map producer domain data 480 to user sessions, and deletes the same on termination actions.

Figure 5:
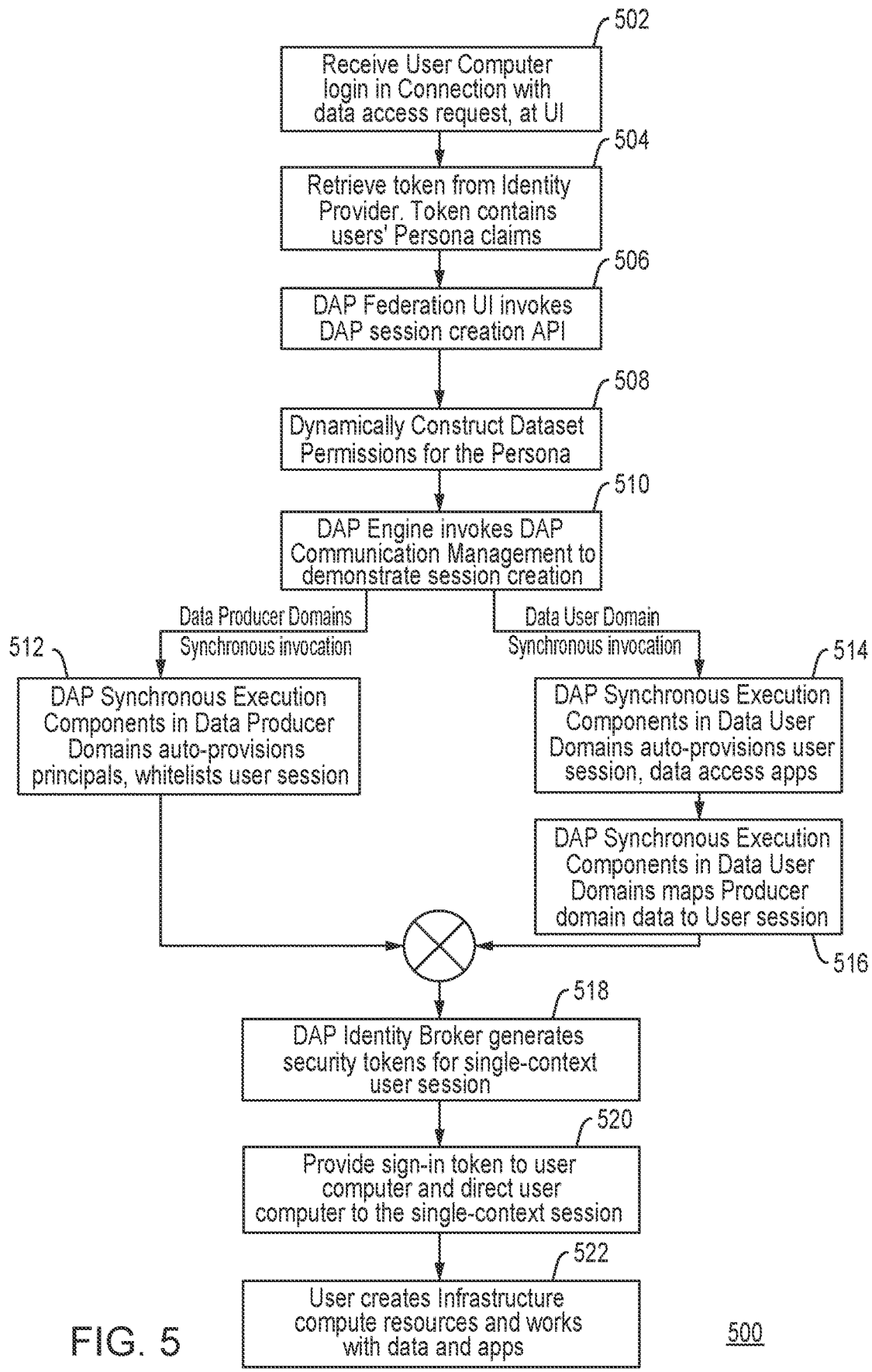
FIG. 5 is a flow diagram illustrating an example of single-context session generation pursuant to access provisioning.

FIG. 5 is a flow diagram illustrating an example of single-context session generation 500 pursuant to access provisioning.

The process 500 initially entails receiving 502 a login to the DAP System with a request for data access. The request is, for example, received from a user computer at the DAP Federation UI as introduced above. The login requirements are set by the enterprise and may include multiple form authentication or the like.

Once the user is properly logged in and authenticated, the DAP Federation UI retrieves 504 a token. This is retrieved from the Identity Provider configured with DAP. The token contains the user's persona claims, which may be in the form of attributes found in the token.

The DAP Federation UI then preferably invokes 506 DAP session creation API that allows the User Computer to communicate with the DAP Engine to provision the session. The DAP Engine evaluates data access policies authored in the DAP Policy Authoring System to dynamically construct dataset permissions for the Persona.

The DAP Engine then invokes 510 the DAP Communication Management component to orchestrate the creation of the single-context session. This involves communications with the data producer and the user domains. On the data producer side, the synchronous components of each Data Producer auto-provision the principals and whitelist the user session for access to their designated content (step 512). In the user domain, The DAP synchronous execution components auto-provision 514 the user session and the data access apps, and map 516 the producer domain data to the user session.

The Identity Broker generates 518 security tokens for the single-context user session. A sign-in token is provided 520 to the user computer, using which the user is directed to the single-context user session to complete the connection for access. The user creates 522 infrastructure compute resources and works with the data and apps to access the data/content of the data producers.

Figure 6:
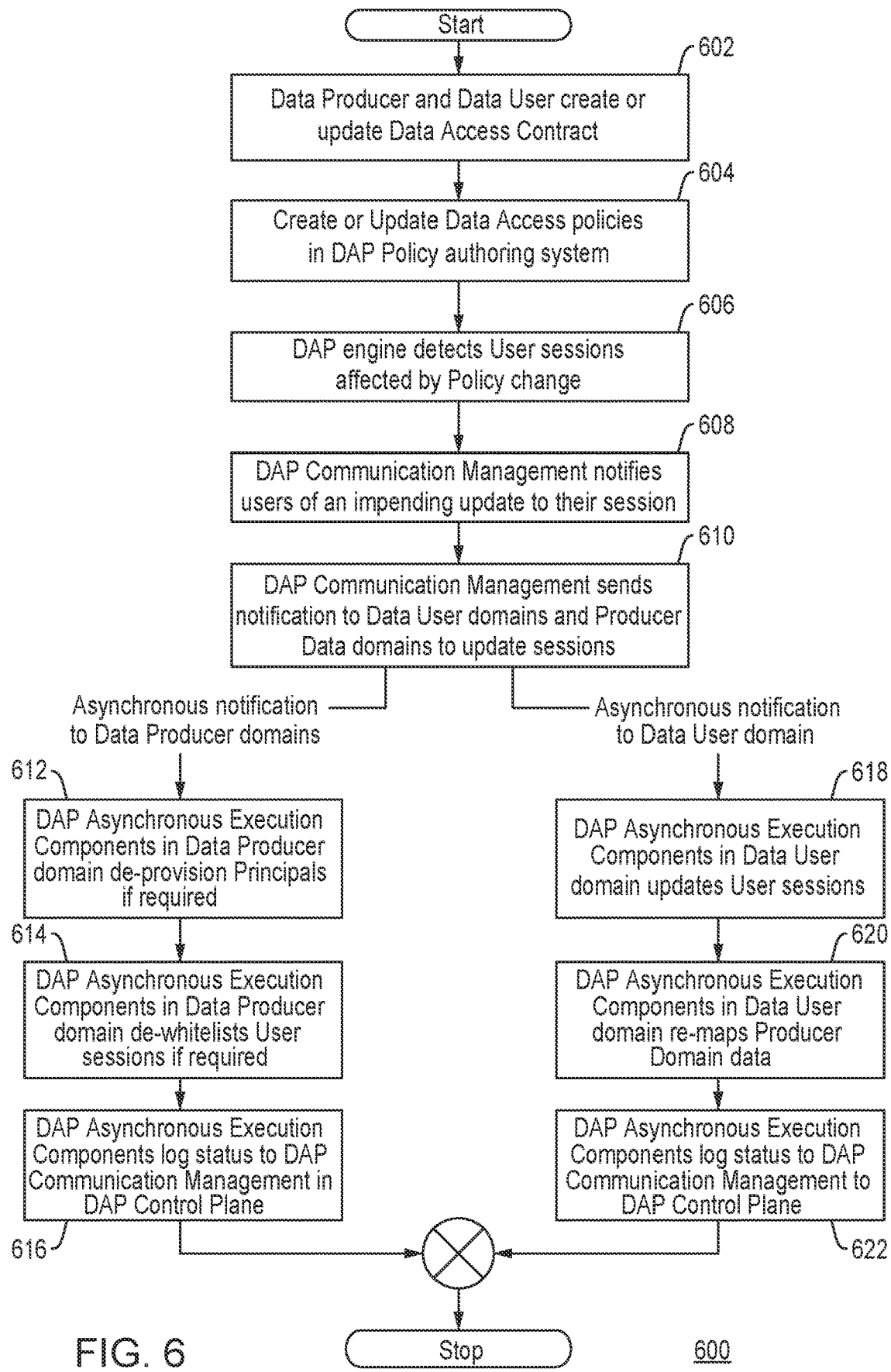
FIG. 6 is a flow diagram illustrating an example of updating data access characteristics while at least one data access session is pending.

FIG. 6 is a flow diagram illustrating an example of a process 600 for updating data access characteristics while at least one data access session is pending. The process 600 initiates with the Data Steward and/or the Data Producer creating or updating 602 a data access contract. The DAP Access Engine then instructs the DAP Policy Authoring System to update the data access policies (604). The DAP Engine engages in ongoing monitoring of the user sessions and detects 606 those user sessions that are affected by the policy change. The DAP Communication Management component initially notifies 608 the users and the data producers as to any impending changes to data access sessions, and then sends 610 notifications to the Data User and Data Producer domains to update the sessions.

As described, the changes may be implemented asynchronously. Additionally, there are respective communications to the Data Producer and Data User domains to carry out the update. On the Data Producer side, the DAP Asynchronous Execution components de-provision 612 the principals and de-whitelist 614 the user sessions as required to terminate any sessions affected by the contract update. Additionally, the DAP asynchronous execution components log 616 the status of the change to the DAP Communication Management component in the DAP Control Plane.

On the user domain side, the DAP Asynchronous Execution components similarly update 618 the existing user session(s) and/or remap 620 the producer domain data in accordance with the contract update. The DAP Asynchronous Execution components on the user domain side then log 622 the completed update with the DAP Communication Management components of the DAP Control Plane.

Figure 7:
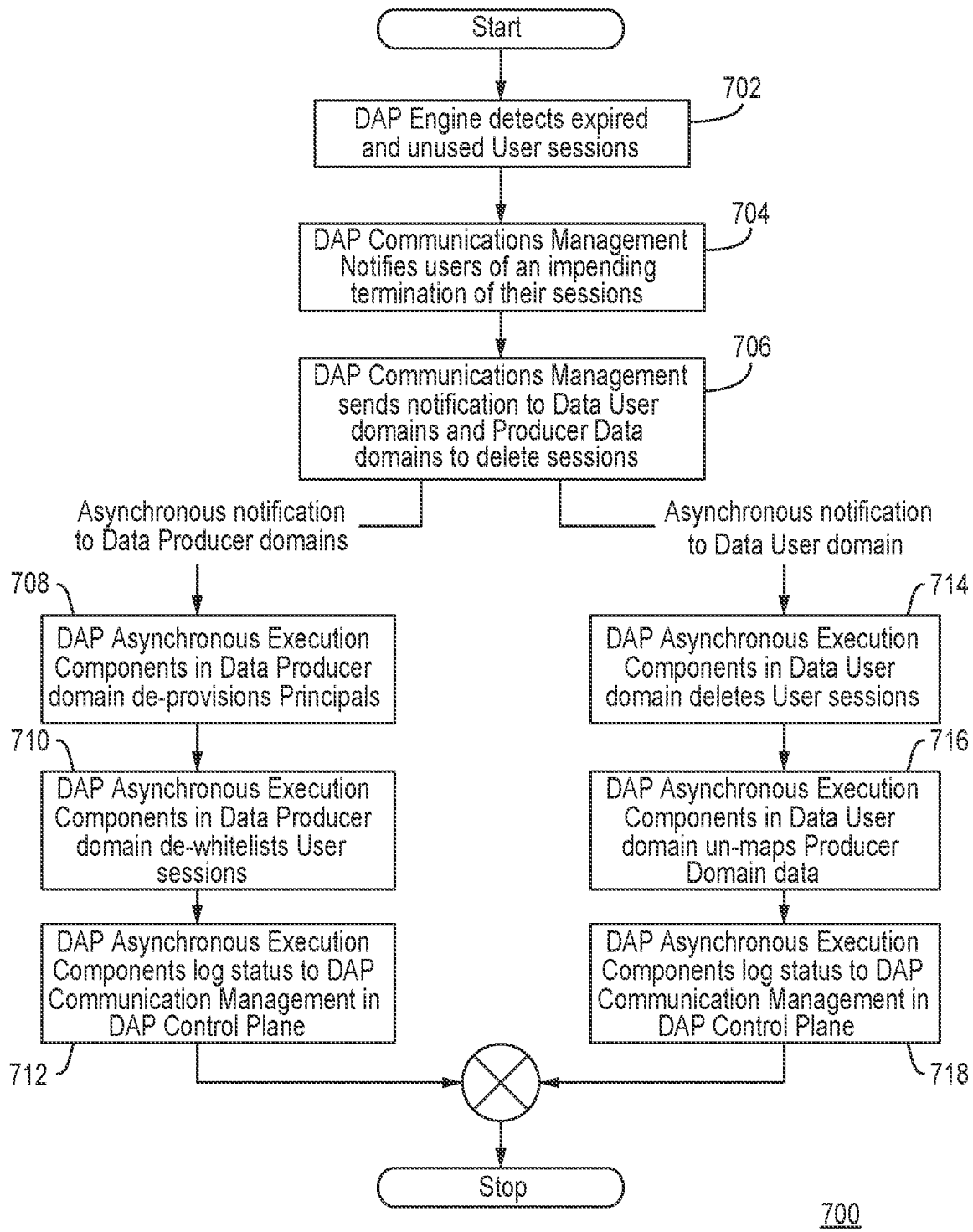
FIG. 7 is a flow diagram illustrating an example of terminating data access sessions.

FIG. 7 is a flow diagram illustrating an example of a process 700 for terminating data access sessions. Here, there may be stale or actively terminated sessions in need of clean up/termination processes. The DAP Engine detects 702 such unused or expired sessions and prompts the DAP Communication management component to notify 704 the user of an impending termination of their session(s). The DAP Communication Management component then sends 706 notification to the Data User and Data Producer domains to carry out the termination.

On the Data Producer side, the DAP Communication Management component invokes the asynchronous components for the termination process. These include de-provisioning 708 the principals and de-whitelisting 710 the user session(s). Once completed the DAP Asynchronous Execution components log 712 the status to the DAP Communication Management component of the DAP Control Plane.

On the User side, the DAP Communication Management component invokes the asynchronous components in the User Domain to delete 714 the user sessions, un-map 716 the producer domain data, and log 718 the status of the same back to the DAP Communication Management component.

Thus, embodiments of the present invention produce and provide methods and apparatuses for data access provisioning. Although the present invention has been described in considerable detail with reference to certain embodiments thereof, the invention may be variously embodied without departing from the spirit or scope of the invention. Therefore, the following claims should not be limited to the description of the embodiments contained herein in any way.

The invention claimed is:

1. A method for data access provisioning, the method comprising:
  receiving, from a user computer of a user, a data access request corresponding to a plurality of datasets, the plurality of datasets respectively having different access criteria;
  generating a single-context session for the data access request, the single-context session extending data access to the plurality of datasets to the user computer; and
  at the time of the data access request from the user computer, using data access policies to dynamically determine dataset permissions corresponding to the user through association to a given persona, the given persona being a context in which the user operates at the time of data access request and being distinct from identity of the user, wherein
  the determined dataset permissions are used to generate the single-context session, the single-context session being configured for the user to gain access to at least one of the datasets via the user computer, and the determined dataset permissions are dynamically determined based upon identification of the user computer, and matching attributes of the given persona with respective attributes of the plurality of datasets.

2. The method of claim 1, wherein generating the single-context session comprises creating principals in domains in which the datasets reside and in the domain of operation of the user.

3. The method of claim 2, further comprising:
destroying the principals on termination of the user session.

4. The method of claim 2, further comprising:
providing a session token for the user computer to login to the single-context session to access data.

5. The method of claim 1, further comprising:
creating temporary access credentials to automatically authorize the user, the user being logged into the single-context session, to access data in different domains where the datasets respectively reside; and
automatically refreshing and extending the temporary access credentials through the life of the single-context session.

6. A non-transitory computer readable medium storing program code for data access provisioning, the program code being executable by a processor to perform operations comprising:
receiving, from a user computer of a user, a data access request corresponding to a plurality of datasets, the plurality of datasets respectively having different access criteria;
generating a single-context session for the data access request, the single-context session extending data access to the plurality of datasets to the user computer; and
at the time of the data access request from the user computer, using data access policies to dynamically determine dataset permissions corresponding to the user through association to a given persona, the given persona being a context in which the user operates at the time of data access request and being distinct from identity of the user, wherein
the determined dataset permissions are used to generate the single-context session, the single-context session being configured for the user to gain access to at least one of the datasets via the user computer, and
the determined dataset permissions are dynamically determined based upon identification of the user computer, and matching attributes of the given persona with respective attributes of the plurality of datasets.

7. The non-transitory computer readable medium of claim 6, wherein generating the single-context session comprises creating principals in domains in which the datasets reside and in the domain of operation of the user.

8. The non-transitory computer readable medium of claim 7, wherein the operations further comprise:
destroying the principals on termination of the user session.

9. The non-transitory computer readable medium of claim 7, wherein the operations further comprise:
providing a session token for the user computer to login to the single-context session to access data in at least one of the datasets.

10. The non-transitory computer readable medium of claim 6, wherein the operations further comprise:
creating temporary access credentials to automatically authorize the user, the user being logged into the single-context session, to access data in different domains where the datasets respectively reside; and
automatically refreshing and extending the temporary access credentials through the life of the single-context session.

11. An apparatus comprising:
a processor, and
a memory storing program code, the program code being executable by the processor to perform operations comprising:
receiving, from a user computer of a user, a data access request corresponding to a plurality of datasets, the plurality of datasets respectively having different access criteria;
generating a single-context session for the data access request, the single-context session extending data access to the plurality of datasets to the user computer; and
at the time of the data access request from the user computer, using data access policies to dynamically determine dataset permissions corresponding to the user through association to a given persona, the given persona being a context in which the user operates at the time of data access request and being distinct from identity of the user, wherein
the determined dataset permissions are used to generate the single-context session, the single-context session being configured for the user to gain access to at least one of the datasets via the user computer, and
the determined dataset permissions are dynamically determined based upon identification of the user computer, and matching attributes of the given persona with respective attributes of the plurality of datasets.

12. The apparatus of claim 11, wherein generating the single-context session comprises creating principals in domains in which the datasets reside and in the domain of operation of the user.

13. The apparatus of claim 12, wherein the operations further comprise:
destroying the principals on termination of the user session.

14. The apparatus of claim 12, wherein the operations further comprise:
providing a session token for the user computer to login to the single-context session to access data in at least one of the datasets.

* * * * *